(12) United States Patent
Miller et al.

(10) Patent No.: US 8,903,028 B2
(45) Date of Patent: Dec. 2, 2014

(54) TIMING RECOVERY FOR LOW ROLL-OFF FACTOR SIGNALS

(71) Applicant: NovelSat Ltd., Ra'anana (IL)

(72) Inventors: Mor Miller, Raanana (IL); Daniel Wajcer, Beit Yehoshua (IL)

(73) Assignee: NovelSat Ltd., Raanana (IL)

( * ) Notice: Subject to any disclaimer, the term of this patent is extended or adjusted under 35 U.S.C. 154(b) by 0 days.

(21) Appl. No.: 13/651,487

(22) Filed: Oct. 15, 2012

(65) Prior Publication Data

US 2014/0079163 A1 Mar. 20, 2014

Related U.S. Application Data

(60) Provisional application No. 61/703,334, filed on Sep. 20, 2012.

(51) Int. Cl.
*H04L 27/06* (2006.01)
*H03D 1/00* (2006.01)
*H04L 27/26* (2006.01)

(52) U.S. Cl.
CPC .................................. *H04L 27/2655* (2013.01)
USPC ............................. 375/343; 375/316; 375/340

(58) Field of Classification Search
CPC .................................................. H04L 27/2655
See application file for complete search history.

(56) References Cited

U.S. PATENT DOCUMENTS

| | | | |
|---|---|---|---|
| 6,717,996 B1 * | 4/2004 | Du Reau et al. ............... | 375/343 |
| 6,980,609 B1 * | 12/2005 | Ahn .............................. | 375/343 |
| 7,263,139 B1 | 8/2007 | Kingston et al. | |
| 7,602,869 B2 * | 10/2009 | Emami-Neyestanak et al. .............................. | 375/355 |
| 2002/0105599 A1 | 8/2002 | Hong et al. | |
| 2003/0026369 A1 | 2/2003 | Murray et al. | |
| 2003/0058929 A1 * | 3/2003 | Cox et al. ....................... | 375/150 |
| 2004/0151269 A1 * | 8/2004 | Balakrishnan et al. ........ | 375/355 |
| 2004/0161071 A1 * | 8/2004 | Chen et al. .................... | 375/376 |
| 2005/0058192 A1 * | 3/2005 | Lee ................................ | 375/224 |
| 2006/0072679 A1 * | 4/2006 | Chen et al. .................... | 375/261 |
| 2006/0088121 A1 * | 4/2006 | Feher ............................. | 375/271 |
| 2008/0238505 A1 * | 10/2008 | Chatterjee ..................... | 327/157 |
| 2008/0240295 A1 | 10/2008 | Kim | |
| 2012/0057664 A1 * | 3/2012 | Knutson et al. ............... | 375/343 |
| 2012/0195239 A1 * | 8/2012 | Belitzer et al. ................ | 370/281 |
| 2012/0281992 A1 * | 11/2012 | Cai et al. ....................... | 398/208 |
| 2013/0045006 A1 * | 2/2013 | Dahan et al. .................. | 398/34 |

OTHER PUBLICATIONS

ETSI EN 302 307, "Digital Video Broadcasting (DVB); Second generation framing structure, channel coding and modulation systems for Broadcasting, Interactive Services, News Gathering and other broadband satellite applications", V1.1.2, 74 pages, Jun. 2006.

(Continued)

*Primary Examiner* — Erin File
(74) *Attorney, Agent, or Firm* — D. Kligler I.P. Services Ltd.

(57) ABSTRACT

A method includes receiving a signal, which carries data in a sequence of symbols that are modulated in accordance with a pulse shape and transmitted in accordance with a timing clock. The received signal is filtered with a matched filter whose response is matched to the pulse shape of the symbols, to produce a filtered signal. The timing clock is initially recovered from the received signal prior to filtering with the matched filter. Upon meeting a predefined condition, a switch is made to recover the timing clock from the filtered signal after filtering with the matched filter. The symbols are demodulated using the recovered timing clock, so as to reconstruct the data.

22 Claims, 2 Drawing Sheets

(56) References Cited

OTHER PUBLICATIONS

ETSI TR 102 376, "Digital Video Broadcasting (DVB); User guidelines for the second generation system for Broadcasting, Interactive Services, News Gathering and other broadband satellite applications (DVB-S2)", V1.1.1, 104 pages, Feb. 2005.

DVB Document A122, "Frame structure channel coding and modulation for a second generation digital terrestrial television broadcasting system (DVB-T2)", 158 pages, Jun. 2008.

Gardner, F.M., "A BPSK/QPSK Timing-Error Detector for Sampled Receivers", IEEE Transactions on Communications, vol. COM-34, No. 5, pp. 423-429, May 1986.

Godard, D.N., "Passband Timing Recovery in an All-Digital Modem Receiver", IEEE Transactions on Communications, vol. COM-26, No. 5, pp. 517-523, May 1978.

Moeneclaey et al., "Carrier-Independent NDA Symbol Synchronization for M-PSK, Operating at Only One Sample Per Symbol", Proceedings of the 1990 IEEE Global Telecommunications Conference (Globecom'90), pp. 594-598, year 1990.

Mueller et al., "Timing Recovery in Digital Synchronous Data Receivers", IEEE Transactions on Communications, vol. COM-24, No. 5, pp. 516- 531, May 1976.

European Application # 13184800.4 Search Report dated Dec. 4, 2013.

* cited by examiner

TIMING RECOVERY FOR LOW ROLL-OFF FACTOR SIGNALS

CROSS-REFERENCE TO RELATED APPLICATIONS

This application claims the benefit of U.S. Provisional Patent Application 61/703,334, filed Sep. 20, 2012, whose disclosure is incorporated herein by reference.

FIELD OF THE INVENTION

The present invention relates generally to communication systems, and particularly to methods and systems for signal reception.

BACKGROUND OF THE INVENTION

Many wireless receivers employ timing recovery mechanisms for recovering the timing of received signals. Timing recovery is used, for example, in Digital Video Broadcasting (DVB) systems specified in "Digital Video Broadcasting (DVB); Second Generation Framing Structure, Channel Coding and Modulation Systems for Broadcasting, Interactive Services, News Gathering and Other Broadband Satellite Applications," European Telecommunications Standards Institute (ETSI) standard EN 302 307, version 1.1.2, June 2006, which is incorporated herein by reference. An example receiver for receiving DVB signals, which comprises a timing recovery loop, is described in DVB document A122, entitled "Frame Structure Channel Coding and Modulation for a Second Generation Digital Terrestrial Television Broadcasting System (DVB-T2)," June 2008, which is incorporated herein by reference.

An example timing error detector is described by Gardner, in "A BPSK/QPSK timing-error detector for sampled receivers," IEEE Transactions on Communications, volume COM-34, no. 5, May 1986, which is incorporated herein by reference. Another timing recovery scheme is described by Godard, in "Passband Timing Recovery in an All-Digital Modem Receiver," IEEE Transactions on Communications, volume COM-26, no. 5, May 1978, which is incorporated herein by reference.

Yet another example of a timing recovery mechanism is described by Moeneclaey and Batsele, in "Carrier-Independent NDA Symbol Synchronization for M-PSK, Operating at Only One Sample per Symbol," Proceedings of the 1990 IEEE Global Telecommunications Conference (Globecom '90), 1990, pages 594-598, which is incorporated herein by reference.

SUMMARY OF THE INVENTION

An embodiment of the present invention that is described herein provides a method including receiving a signal, which carries data in a sequence of symbols that are modulated in accordance with a pulse shape and transmitted in accordance with a timing clock. The received signal is filtered with a matched filter whose response is matched to the pulse shape of the symbols, to produce a filtered signal. The timing clock is initially recovered from the received signal prior to filtering with the matched filter. Upon meeting a predefined condition, a switch is made to recover the timing clock from the filtered signal after filtering with the matched filter. The symbols are demodulated using the recovered timing clock, so as to reconstruct the data.

In some embodiment, the predefined condition specifies that a frequency offset in the received signal is below a predefined threshold. In an embodiment, the method includes applying initial frequency correction to the received signal before recovering the timing clock. In an example embodiment, the received signal has a roll-off factor smaller than 20%. In another example embodiment, the received signal has a frequency offset larger than 5% of a rate of the symbols in the sequence.

There is additionally provided, in accordance with an embodiment of the present invention, apparatus including a receiver front-end, a matched filter, a timing recovery unit and a demodulation unit. The receiver front-end is configured to receive a signal that carries data in a sequence of symbols, which are modulated in accordance with a pulse shape and transmitted in accordance with a timing clock. The matched filter has a response matched to the pulse shape of the symbols, and is configured to filter the received signal so as to produce a filtered signal. The timing recovery unit is configured to initially recover the timing clock from the received signal prior to filtering with the matched filter, and, upon meeting a predefined condition, to switch to recover the timing clock from the filtered signal after filtering with the matched filter. The demodulation unit is configured to demodulate the symbols using the recovered timing clock, so as to reconstruct the data.

There is also provided, in accordance with an embodiment of the present invention, a method including receiving a signal that carries data in a sequence of modulated symbols, which are transmitted in accordance with a timing clock. Estimates of the data are computed. The received signal is synchronized to the timing clock using a blind timing recovery process, which does not depend on the estimates of the data, so as to produce a blind-synchronized signal. The blind-synchronized signal is synchronized to the timing clock using a Decision-Directed (DD) timing recovery process that operates on the estimates of the data, so as to produce a DD-synchronized signal from which the estimates of the data are computed.

In some embodiments, synchronizing the blind-synchronized signal using the DD timing recovery process includes calculating the estimates of the data over known symbols. In an alternative embodiment, synchronizing the blind-synchronized signal using the DD timing recovery process includes calculating the estimates of the data over unknown data symbols. In a disclosed embodiment, synchronizing the blind-synchronized signal using the DD timing recovery process includes estimating a timing error of the signal by sampling the signal at half-symbol offsets relative to a sampling phase that is used for producing the estimates of the data.

In an embodiment, the method includes applying initial frequency correction to the received signal before synchronizing the signal to the timing clock. In an example embodiment, the received signal has a roll-off factor smaller than 20%. In another example embodiment, the received signal has a frequency offset larger than 5% of a rate of the symbols in the sequence.

There is further provided, in accordance with an embodiment of the present invention, apparatus including a receiver front-end, a decision unit, and first and second timing recovery units. The receiver front-end is configured to receive a signal that carries data in a sequence of modulated symbols, which are transmitted in accordance with a timing clock. The decision unit is configured to compute estimates of the data. The first timing recovery unit is configured to synchronize the received signal to the timing clock using a blind timing recovery process, which does not depend on the estimates of the data, so as to produce a blind-synchronized signal. The second timing recovery unit is configured to synchronize the blind-synchronized signal to the timing clock using a Decision-Directed (DD) timing recovery process that operates on the estimates of the data, so as to produce a DD-synchronized signal from which the decision unit computes the estimates of the data.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for timing recovery in radio receivers. The embodiments described herein refer mainly to DVB satellite receivers, and to signals having small Roll-Off Factor (ROF), but the disclosed techniques are applicable in various other receivers, applications and signal types.

In some embodiments, the received signal comprises a sequence of symbols that have been modulated with a certain modulation pulse shape. The receiver filters the received signal using a matched filter, whose response is matched to this modulation pulse shape. The receiver carries out a two-stage blind timing recovery process. In the first stage, the receiver recovers the symbol timing from the signal at the input of the matched filter. In the second stage, the receiver switches to recover the symbol timing from the signal at the output of the matched filter. The receiver may switch from the first stage to the second stage, for example, upon detecting that the frequency offset in the received signal has fallen below a certain threshold.

This technique exploits the advantages and avoids the disadvantages of timing recovery before and after matched filtering. When the frequency offset is large, the matched filter may filter-out a considerable portion of the signal, and timing recovery after matched filtering is likely to fail. Under these conditions, it is preferable to recover the signal timing before matched filtering, even though the timing accuracy may be slightly degraded. When the frequency offset is small, it is preferable to recover the signal timing after matched filtering and thus achieve higher accuracy. These trade-offs are discussed in greater detail below, and particularly with regard to low-ROF signals and other real-life signal characteristics.

In some embodiments, the receiver applies a cascade of blind timing recovery (which does not depend on data estimates) followed by Decision-Directed (DD) timing recovery (which does depend on data estimates). The blind timing recovery process performs coarse and robust timing recovery, which enables the receiver to produce valid data estimates with high likelihood. The DD timing recovery process uses these data estimates to achieve high timing accuracy. Several examples of blind and DD timing recovery processes are described.

The disclosed techniques provide highly robust and accurate timing recovery. These techniques are well suited for operating under difficult signal environments, such as large frequency offsets between the transmitter and the receiver, low ROF, strong adjacent channel signals, strong Inter-Symbol Interference (ISI) including asymmetric-frequency ISI, and high timing jitter.

System Description

Figure 1:
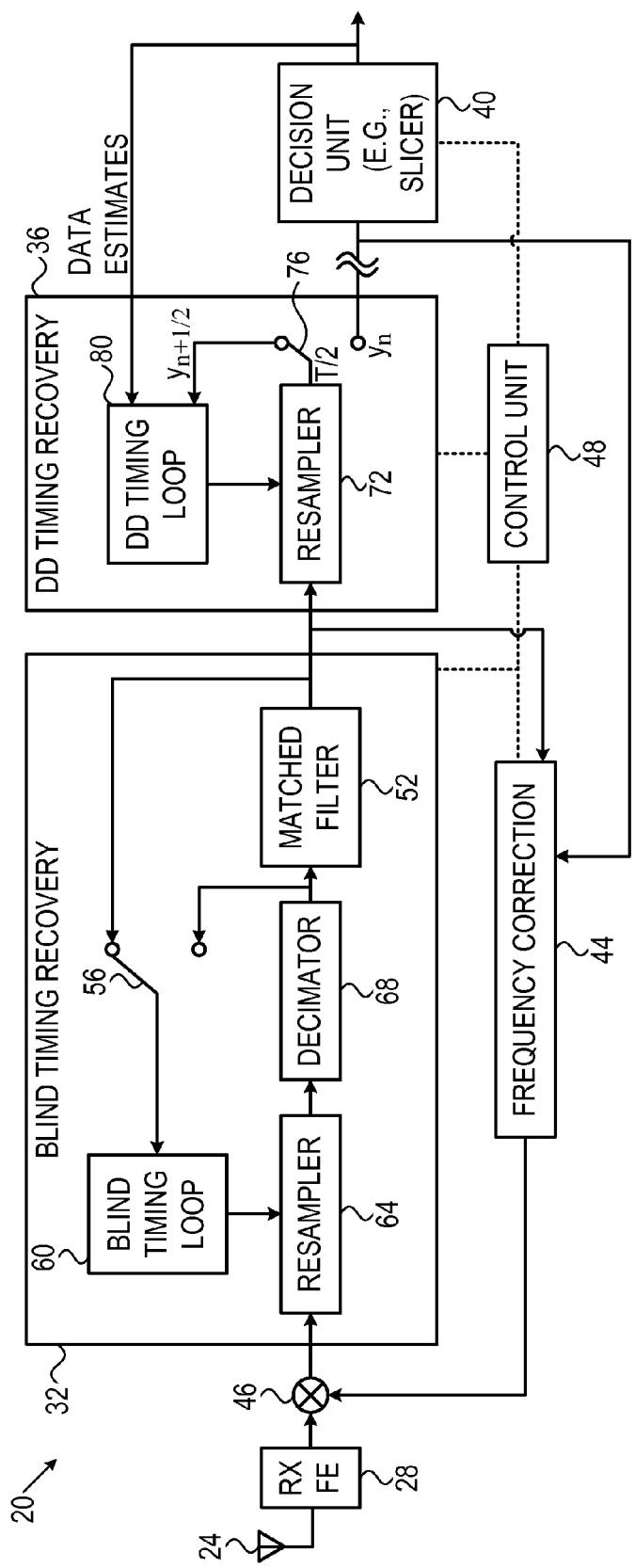
FIG. 1 is a block diagram that schematically illustrates a receiver, in accordance with an embodiment of the present invention.

FIG. 1 is a block diagram that schematically illustrates a receiver 20, in accordance with an embodiment of the present invention. In the present example, receiver 20 receives signals from a satellite as part of a Digital Video Broadcasting (DVB) system. Alternatively, however, receiver 20 can be used in any other suitable communication system operating in accordance with any other suitable standard or protocol.

Receiver 20 receives a Radio Frequency (RF) signal from a transmitter (not shown). The signal carries data in a sequence of modulated symbols. Any suitable modulation scheme can be used, such as, for example, various Phase Shift Keying (PSK), Amplitude Phase Shift Keying (APSK) or Quadrature Amplitude Modulation (QAM) schemes. Typically, the modulated symbols are shaped in the transmitter with a certain modulation pulse shape.

The modulation pulse shape has an impact on the spectral shape of the signal in the frequency domain. One possible measure of the spectral shape is referred to as a Roll-Off Factor (ROF). The roll-off factor is a measure of the excess bandwidth of the signal, i.e., the bandwidth occupied beyond the Nyquist bandwidth of 1/T, which also denotes the symbol rate. The ROF is typically a number between zero and unity, such that zero roll-off corresponds to a rectangular spectrum with no excess bandwidth, and large roll-off corresponds to a gradually-decaying spectral response having large excess bandwidth. The total bandwidth occupied by the signal can thus be written as (1+ROF)/T.

As will be explained below, the disclosed techniques are particularly suitable for receiving signals having small roll-off factor, e.g., smaller than 20% or on the order of ROF=5%. Nevertheless, these techniques are well suited for receiving signals having any other suitable ROF, e.g., the ROF≥20% signals specified in the DVB specifications, cited above.

Receiver 20 comprises an antenna 24 and a receiver front-end (RX FE) 28 for receiving the RF signal from the transmitter. RF FE 28 down-converts the RF signal to baseband, digitizes the baseband signal, and applies other functions such as filtering and low-noise amplification.

After digitization, receiver 20 processes the baseband signal in order to reconstruct the transmitted data. Typically, the receiver carries out functions such as Automatic Gain Control (AGC), frequency correction, carrier phase recovery, channel equalization and timing recovery. The description that follows is mainly concerned with timing recovery, and other receiver functions are therefore omitted from the figure for the sake of clarity.

In some embodiments, receiver 20 comprises a blind timing recovery unit 32, followed by a Decision-Directed (DD) timing recovery unit 36. The signal at the output of unit 36 is provided to a decision unit 40, e.g., a slicer, which estimates the data bits that were most likely transmitted by the transmitter. Additional modules or functions may be performed between DD timing recovery unit 36 and decision unit 40, for example adaptive equalization (not shown).

Unit 32 carries out a blind timing recovery process, which does not depend on the data estimates of unit 40. Unit 36, on the other hand, carries out a DD timing recovery process that depends on the data estimates. Typically, each of the timing recovery units adjusts the symbol sampling times so as to converge to the optimal sampling times. In other words, each timing recovery unit synchronizes the symbol timing clock used for sampling the signal to the timing clock with which the symbols are transmitted. A control unit 48 controls the various receiver elements, including units 32, 36 and 40.

In the example of FIG. 1, unit 32 comprises a resampler 64 that adjusts the symbol sampling times. The resampled signal at the output of resampler 64 is optionally decimated by a decimator 68 so as to reduce the sampling rate. The signal is then filtered by a Matched Filter (MF) 52. A blind timing loop unit 60 processes either the input or the output of MF 52, so as to produce an error signal. The error signal is indicative of the timing error or timing offset between the current sampling times and the optimal sampling times. The error signal is used for adjusting the symbol sampling times in resampler 64.

Unit 32 may apply any suitable blind timing recovery scheme for controlling resampler 64. Several example schemes that can be used for this purpose are described in the articles by Gardner, Godard, and Moeneclaey and Batsele, cited above.

In some embodiments, control unit 48 selects whether to control the blind timing loop using the input or the output of matched filter 52. The rationale and criteria for this selection are explained in detail further below. In the present example, unit 32 comprises a switch 56 that is controlled by control unit 48 for this purpose.

In an embodiment, receiver 20 comprises a frequency correction loop 44, which compensates for frequency offsets in the received signal. Loop 44 may estimate the frequency offset in the signal at various accuracies and based on inputs from various points in receiver 20, such as the output of unit 32 and/or the output of DD timing recovery unit 36. In some embodiments loop 44 comprises both coarse and fine frequency correction mechanisms. Loop 44 adjusts the frequency of the signal at the input of unit 32 so as to cancel the frequency offset. In the present example, the frequency adjustment is applied using a multiplier or rotator 46.

In some embodiments, DD timing recovery unit 36 comprises a resampler 72, which resamples the signal in order to cancel the remaining timing error. A DD timing loop 80 receives the output of resampler 72, as well as the data estimates from decision unit 40, and produces an error signal for controlling resampler 72. Unit 36 may apply any suitable DD timing recovery scheme. One example scheme is the Mueller-Muller (MM) timing detector, which is described by Mueller and Muller, in "Timing Recovery in Digital Synchronous Data Receivers," IEEE Transactions on Communications, volume COM-24, May 1976, pages 516-531, which is incorporated herein by reference.

In some embodiments, the sampling rate at the output of resampler 72 is two samples per Symbol (SPS). A switch 76 de-multiplexes the resampler output alternately to decision unit 40 and to DD timing loop 80. Thus, the DD timing loop and the decision unit each receives a signal at one sample per symbol. This feature is addressed in greater detail below. In various embodiments, the data estimates used for the DD timing recovery in unit 36 are computed over user data, and/or over known symbols such as header/pilot symbols and/or preamble symbols.

In some embodiments, receiver 20 comprises an initial frequency correction unit (not shown in the figure) between front-end 28 and rotator 46. Such a frequency correction unit typically reduces the frequency error at the input of unit 32 to a value that enables the blind timing recovery process to operate properly. In an example embodiment, the frequency error at the input of unit 32 is maintained below 30% of the signal bandwidth.

The receiver configuration of FIG. 1 is an example configuration, which is chosen purely for the sake of conceptual clarity. In alternative embodiments, any other suitable receiver configuration can also be used. Receiver elements that are not mandatory for understanding of the disclosed techniques have been omitted from the figure for the sake of clarity.

The elements of receiver 20 can be implemented using hardware, such as in one or more Radio Frequency Integrated Circuits (RFICs), Application-Specific Integrated Circuits (ASICs) or Field-Programmable Gate Arrays (FPGAs). Alternatively, some elements of receiver 20 (e.g., the functions of control unit 48) may be implemented is software, or using a combination of hardware and software elements.

In some embodiments, control unit 48 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Timing Recovery Challenges in Real-Life Signal Scenarios

In some embodiments, the RF signal provided to receiver 20 for reception is particularly challenging. In an example scenario, the signal has one or more of the following characteristics:

Large frequency offset between the receiver and the transmitter, e.g., higher than 5% and sometimes on the order of 30% of the signal bandwidth or symbol rate (baud rate).

Small ROF, e.g., smaller than 20%. In an example embodiment, the signal comprises a DVB NS-3 signal with ROF=5%.

Strong adjacent carriers, e.g., having spectral density higher by 10 dB or more than the desired signal. Taking advantage of the small ROF, the inter-carrier spacing is typically small, meaning that the strong adjacent carriers are close in frequency to the desired signal. Generally, however, the adjacent carriers may have small of large ROF.

Channel with strong Inter-Symbol-Interference (ISI). In an example embodiment, the signal occupies the bandwidth of an entire satellite transponder and suffers from ISI caused by both input multiplexing (IMUX) and output multiplexing (OMUX) filtering.

Frequency-asymmetric ISI. In some cases the channel response is asymmetric in frequency, e.g., has a slope across the channel bandwidth. Some timing recovery processes are sensitive to such ISI and their degraded performance translates to poor signal quality, e.g., high Error Vector Magnitude (EVM).

Large timing jitter.

Figure 2:
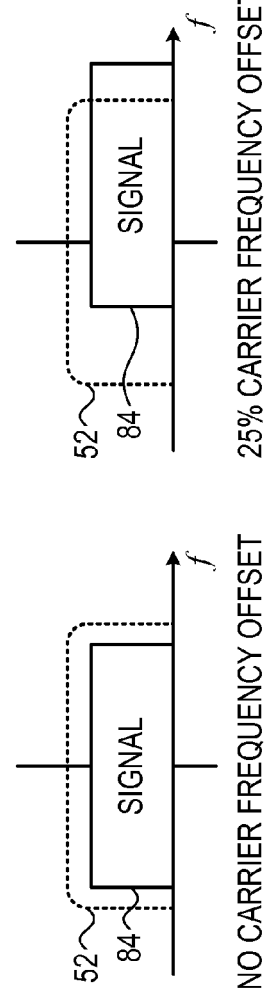
FIG. 2 is a diagram that schematically illustrates examples of frequency offsets of a received signal relative to a matched filter, in accordance with an embodiment of the present invention.

FIG. 2 is a diagram that schematically illustrates examples of the frequency offset between a received signal 84 and the transfer function of matched filter 52, in accordance with an embodiment of the present invention. The left-hand-side of the figure shows an ideal scenario having no frequency offset. In such a scenario, the signal is filtered perfectly by the matched filter, and it is typically straightforward to recover the symbol timing clock from the matched filter output.

The right-hand-side of FIG. 2 shows a real-life scenario in which the carrier frequency offset between the transmitter and the receiver is 25%. In such a scenario, matched filter 52 filters-out a considerable portion of the signal, and thus may cause considerable degradation in timing recovery performance.

Timing recovery processes are particularly sensitive to distortion at the edges of the signal spectrum. Therefore, performing timing recovery on the matched filter output in such scenarios is likely to fail. The degradation may be particularly severe in the presence of other harsh signal characteristics described above.

In some embodiments, receiver 20 overcomes these challenges using two mechanisms that are described below. The first mechanism recovers the signal timing initially from the matched filter input and later from the matched filter output. The second mechanism uses a cascade of blind timing recovery followed by decision-directed timing recovery. In the example of FIG. 1 the two mechanisms are implemented together in the receiver. In alternative embodiments, however, the receiver may carry out only one of them.

Timing Recovery by Processing the Received Signal Before and After Matched Filtering In some embodiments, blind timing recovery unit 32 carries out a two-stage process. In the first stage, when the signal is first applied to the receiver, unit 32 recovers the signal timing from the signal at the input of matched filter 52. For this purpose, control unit 48 switches switch 56 to the bottom position (FIG. 1) such that the input of matched filter 52 (the output of decimator 68) is provided as input to blind timing loop 60.

At this stage, frequency correction loop 44 has typically not converged yet, and the frequency offset between the transmitter and receiver may be large. Under these conditions (e.g., the right-hand-side of FIG. 2 above), it is preferable to recover the signal timing from the matched filter input. Recovering the signal timing from the matched filter input may have degraded accuracy, but is much more likely to converge under high frequency offset.

At a later point in time, control unit 48 decides to switch to recover the signal timing from the output of matched filter 52. The control unit may decide to switch based on various conditions. In an example embodiment, unit 48 switches to recover the signal timing from the output of matched filter 52 upon receiving an indication that the frequency offset is below a certain threshold value.

Typically, unit 48 has no direct estimate of the actual frequency offset in the signal, and therefore uses indirect indications for this purpose. For example, unit 48 may receive from frequency correction loop 44 an indication that the fine frequency correction mechanism has converged. As another example, unit 48 may receive an indication that the adaptive equalizer has converged. Additionally or alternatively, unit 48 may switch to recover the signal timing from the output of matched filter 52 based on any other suitable information that is indicative of the residual frequency offset in the signal.

Alternatively, any other suitable switching condition can be used. In order to transition to the second stage, control unit 48 switches switch 56 to the top position (FIG. 1) such that the output of matched filter 52 is provided as input to blind timing loop 60.

At this stage, frequency correction loop 44 has typically converged to achieve small residual frequency offset. With small frequency offset, blind timing recovery from the matched filter output is likely to converge well, and will typically achieve higher accuracy relative to recovery from the matched filter input.

Figure 3:
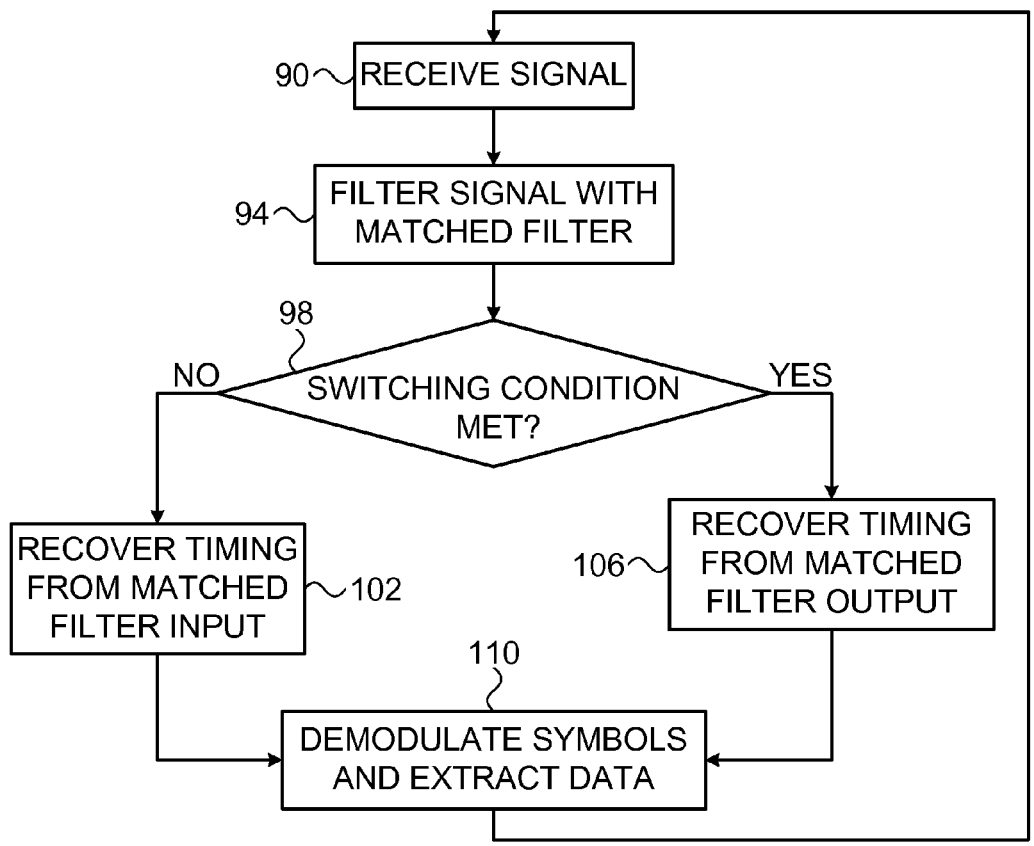
FIGS. 3 and 4 are flow charts that schematically illustrate methods for timing recovery, in accordance with embodiments of the present invention.

FIG. 3 is a flow chart that schematically illustrates a method for timing recovery, in accordance with an embodiment of the present invention. The method begins with receiver 20 receiving an RF signal, at a reception step 90. The receiver filters the received signal with matched filter 52, at a filtering step 94.

Control unit 48 checks whether a predefined switching condition is met, at a checking step 98. In the present example, unit 48 checks whether the fine frequency estimation has converged or alternatively the equalizer has converged.

If the switching condition is not met, blind timing recovery unit 32 recovers the signal timing from the input of matched filter 52 (switch 56 set to the bottom position in FIG. 1), at a MF-input recovery step 102. If the switching condition is met, unit 32 recovers the signal timing from the output of matched filter 52 (switch 56 set to the top position in FIG. 1), at a MF-output recovery step 106. Decision unit 40 demodulates the symbols following timing recovery, so as to extract the data, at a demodulation step 110.

Cascaded Blind and Decision-Directed Timing Recovery

In some embodiments, as in FIG. 1 above, receiver 20 carries out a cascade of blind timing recovery (using unit 32) and DD timing recovery (using unit 36). The blind timing recovery process is well suited for performing coarse timing recovery, to reach conditions where decision unit 40 produces valid decisions (data estimates) with high likelihood. The DD timing recovery relies on these data estimates and provides highly accurate timing recovery. As a result, the signal at the output of the cascade is time-synchronized with very high accuracy, which is achievable under severe signal conditions.

Figure 4:
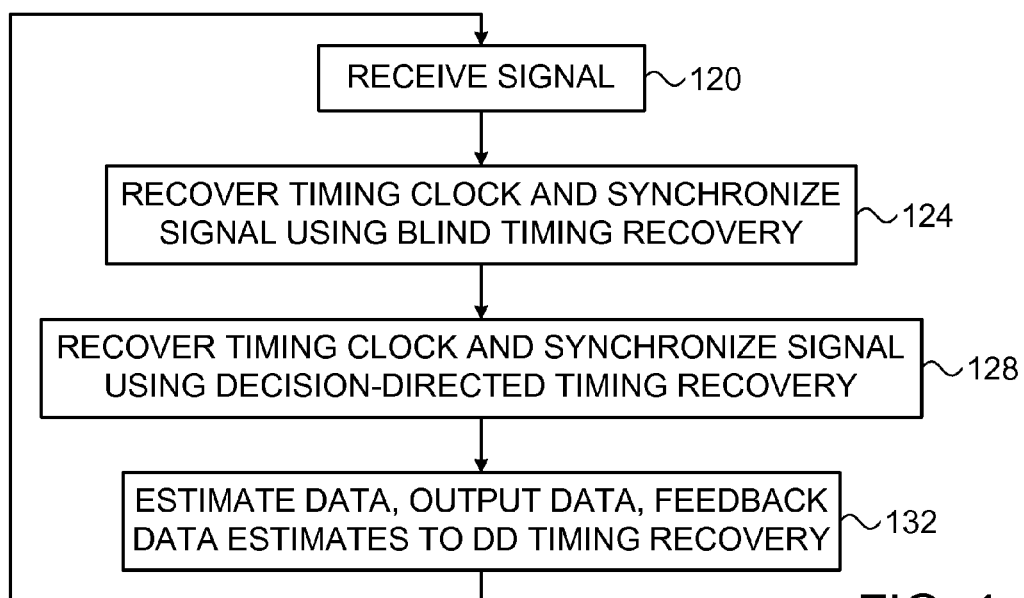

FIG. 4 is a flow chart that schematically illustrates a method for timing recovery, in accordance with an embodiment of the present invention. The method begins with receiver 20 receiving a signal, at a signal reception step 120. Unit 32 recovers the signal timing clock and synchronizes (e.g., resamples) the signal to the recovered timing clock using blind timing recovery, at a blind recovery step 124. The output of unit 32 is provided to unit 36.

Unit 36 recovers the signal timing clock and synchronizes (e.g., resamples) the signal to the recovered timing clock using DD timing recovery, at a DD recovery step 128. The output of unit 36 is provided to decision unit 40. Decision unit 40 produces estimates of the data (decisions), outputs the decoded data, and feeds-back the data estimates to unit 36 for use in the DD timing recovery process, at a decision step 132.

In the present example, both the blind and the DD timing recovery processes are active continuously. In alternative embodiments, however, control unit 48 may decide to deactivate any of these processes for a certain period of time or upon meeting some criterion.

In some embodiments, DD timing recovery unit 36 recovers the timing using only data estimates computed over known symbols. This technique is robust and can be used, for example, when the timing is sufficiently stable over time. The term "known symbols" refers, for example, to headers, Start of Frame (SoF) symbols, pilot symbols or other symbols whose values are known in advance to the decision unit. In the case of pilot symbols, the symbol values may now be known with absolute certainty, but they are decoded with very low error probability, considerably lower than the error probability of user data symbols. In alternative embodiments, unit 36 may recover the signal timing using data estimates computes over any other suitable part of the signal, e.g., user data symbols, either known in advance or not.

In some embodiments, unit 36 operates in accordance with the Muller-Mueller (MM) algorithm, cited above. The MM algorithm typically comprises a DD timing error detector that operates at one Sample Per Symbol (SPS), and can be written as:

$$e_n = \hat{a}_n(y_{n+1} - y_{n-1})$$

wherein $\hat{a}_n$ denotes the data estimate (hard decision) of unit 40 for the $n^{th}$ received symbol, and $y_{n+1}$, $y_{n-1}$ denote the $(n+1)^{th}$ and $(n-1)^{th}$ soft symbols. The expected value of the estimated error is:

$$E(e_n) = h_1 - h_{-1}$$

wherein $h_n$ denotes the impulse response of the channel from $a_n$ (the $n^{th}$ transmitted symbol) to $y_n$. This detector is based on the assumption that, in a symmetric channel, the optimal sampling point satisfies $h_1 = h_{-1}$, so that $h_0$ is the peak of the channel.

In an example embodiment, when implementing the MM algorithm in unit 36, $y_n$ comprises the slicer input (input of decision unit 40) after equalization, in which case the channel $h_n$ should comprise a perfect Nyquist pulse, and the condition $h_1 = h_{-1}$ would indeed yield the optimal sampling phase.

In an alternative embodiment, $y_n$ is taken from the output of the DD resampler 72, before equalization. In this embodiment, the channel $h_n$ comprises the actual channel between the transmitter and the receiver. In this solution, when the ISI is frequency-asymmetric, the timing recovery accuracy may be degraded.

One possible way to overcome this performance penalty is to operate the timing detector as two SPS, in which case the timing error can be written as:

$$e_n = \hat{a}_n \left( y_{n+\frac{1}{2}} - y_{n-\frac{1}{2}} \right)$$

In this embodiment, the timing detector searches for the timing phase for which $$h_{\frac{1}{2}} = h_{-\frac{1}{2}}$$

The rationale behind this scheme is that the channel tends to be more symmetrical in close proximity to the peak of the channel impulse response.

In some implementations of receiver 20, matched filter 52 operates at two SPS, and therefore the signal samples $$y_{n+\frac{1}{2}}, y_{n-\frac{1}{2}}$$

are readily available. In the example of FIG. 1, switch 76 alternates at a rate of two SPS. Soft symbols $y_n$ (sampled at the optimal sampling times) are provided to decision unit 40 for generating data estimates, and samples $$y_{n+\frac{1}{2}}$$

(sampled at half-symbol shifts) are provided to unit 36 for operating the timing detector.

Further alternatively, unit 36 may carry out any other suitable DD timing recovery process.

Although the embodiments described herein mainly address satellite communication, the methods and systems described herein can also be used in other applications, such as in cable, Ethernet, and power-line modems or any other communication method that employs single-carrier modulation.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving a signal, which carries data in a sequence of symbols that are modulated in accordance with a pulse shape and transmitted in accordance with a timing clock;
filtering the received signal with a matched filter whose response is matched to the pulse shape of the symbols, to produce a filtered signal;
initially recovering the timing clock from the received signal prior to filtering with the matched filter, and, upon meeting a predefined condition, switching to recover the timing clock from the filtered signal after filtering with the matched filter; and
demodulating the symbols using the recovered timing clock, so as to reconstruct the data.

2. The method according to claim 1, wherein the predefined condition specifies that a frequency offset in the received signal is below a predefined threshold.

3. The method according to claim 1, and comprising applying initial frequency correction to the received signal before recovering the timing clock.

4. The method according to claim 1, wherein the received signal has a roll-off factor smaller than 20%.

5. The method according to claim 1, wherein the received signal has a frequency offset larger than 5% of a rate of the symbols in the sequence.

6. Apparatus, comprising:
a receiver front-end, which is configured to receive a signal that carries data in a sequence of symbols, which are modulated in accordance with a pulse shape and transmitted in accordance with a timing clock;
a matched filter, which has a response that is matched to the pulse shape of the symbols, and which is configured to filter the received signal so as to produce a filtered signal;

a timing recovery unit, which is configured to initially recover the timing clock from the received signal prior to filtering with the matched filter, and, upon meeting a predefined condition, to switch to recover the timing clock from the filtered signal after filtering with the matched filter; and a demodulation unit, which is configured to demodulate the symbols using the recovered timing clock, so as to reconstruct the data.

7. The apparatus according to claim 6, wherein the predefined condition specifies that a frequency offset in the received signal is below a predefined threshold.

8. The apparatus according to claim 6, and comprising an initial frequency correction unit, which is configured to apply initial frequency correction to the received signal before recovering the timing clock.

9. The apparatus according to claim 6, wherein the received signal has a roll-off factor smaller than 20%.

10. The apparatus according to claim 6, wherein the received signal has a frequency offset larger than 5% of a rate of the symbols in the sequence.

11. A method, comprising:
receiving a signal that carries data in a sequence of modulated symbols, which are transmitted in accordance with a timing clock, and computing estimates of the data;
synchronizing the received signal to the timing clock using a blind timing recovery process, which does not depend on the estimates of the data, so as to produce a blind-synchronized signal; and
synchronizing the blind-synchronized signal to the timing clock using a Decision-Directed (DD) timing recovery process that operates on the estimates of the data, so as to produce a DD-synchronized signal from which the estimates of the data are computed,
wherein synchronizing the blind-synchronized signal using the DD timing recovery process comprises estimating a timing error of the signal by sampling the signal at half-symbol offsets relative to a sampling phase that is used for producing the estimates of the data.

12. The method according to claim 11, wherein synchronizing the blind-synchronized signal using the DD timing recovery process comprises calculating the estimates of the data over known symbols.

13. The method according to claim 11, wherein synchronizing the blind-synchronized signal using the DD timing recovery process comprises calculating the estimates of the data over unknown data symbols.

14. The method according to claim 11, and comprising applying initial frequency correction to the received signal before synchronizing the signal to the timing clock.

15. The method according to claim 11, wherein the received signal has a roll-off factor smaller than 20%.

16. The method according to claim 11, wherein the received signal has a frequency offset larger than 5% of a rate of the symbols in the sequence.

17. Apparatus, comprising:
a receiver front-end, which is configured to receive a signal that carries data in a sequence of modulated symbols, which are transmitted in accordance with a timing clock;
a decision unit, which is configured to compute estimates of the data;
a first timing recovery unit, which is configured to synchronize the received signal to the timing clock using a blind timing recovery process, which does not depend on the estimates of the data, so as to produce a blind-synchronized signal; and
a second timing recovery unit, which is configured to synchronize the blind-synchronized signal to the timing clock using a Decision-Directed (DD) timing recovery process that operates on the estimates of the data, so as to produce a DD-synchronized signal from which the decision unit computes the estimates of the data,
wherein the second timing recovery unit is configured to estimate a timing error of the signal by sampling the signal at half-symbol offsets relative to a sampling phase that is used for producing the estimates of the data.

18. The apparatus according to claim 17, wherein the second timing recovery unit is configured to calculate the estimates of the data over known symbols.

19. The apparatus according to claim 17, wherein the second timing recovery unit is configured to calculate the estimates of the data over unknown data symbols.

20. The apparatus according to claim 17, and comprising an initial frequency correction unit, which is configured to apply initial frequency correction to the received signal before synchronizing the signal to the timing clock.

21. The apparatus according to claim 17, wherein the received signal has a roll-off factor smaller than 20%.

22. The apparatus according to claim 17, wherein the received signal has a frequency offset larger than 5% of a rate of the symbols in the sequence.

* * * * *